Nov. 24, 1936.   H. NUTT ET AL   2,062,101
FRICTION CLUTCH
Filed Dec. 2, 1932   2 Sheets-Sheet 1
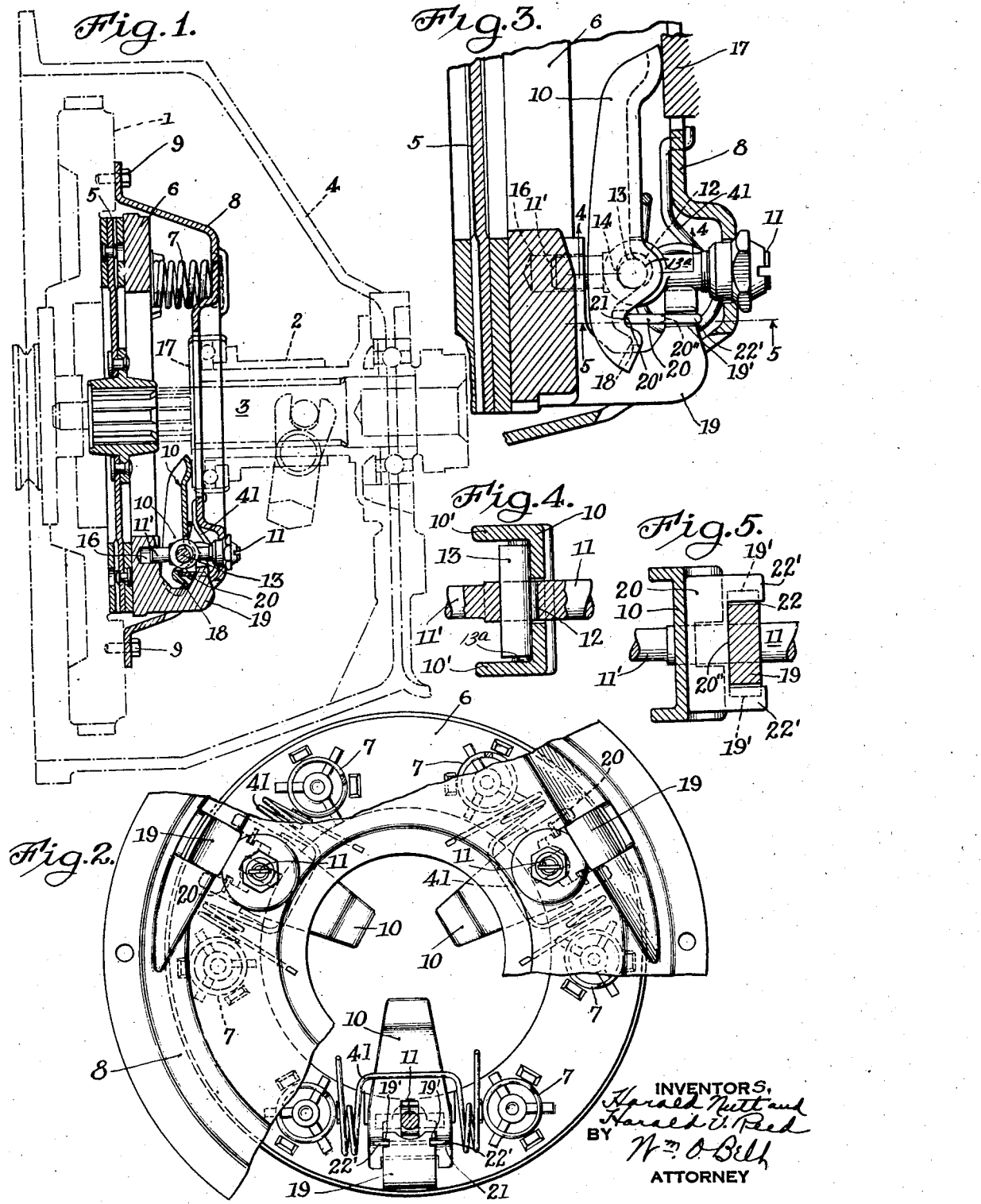

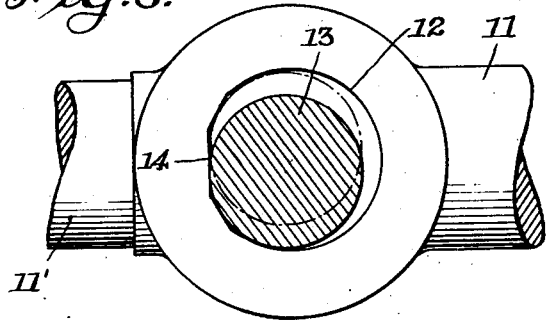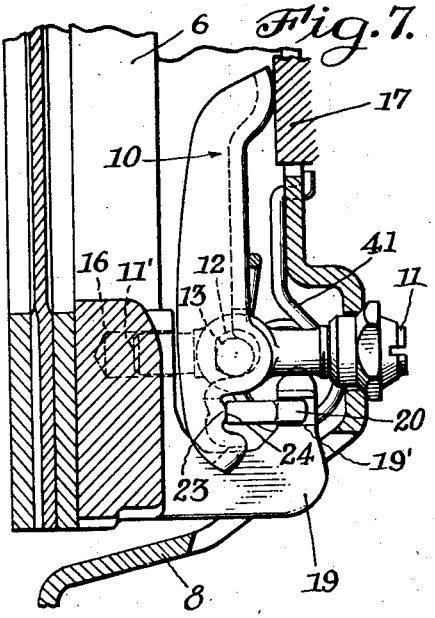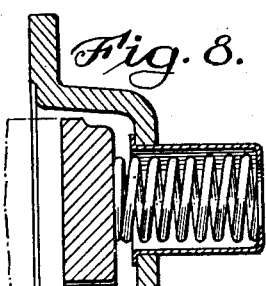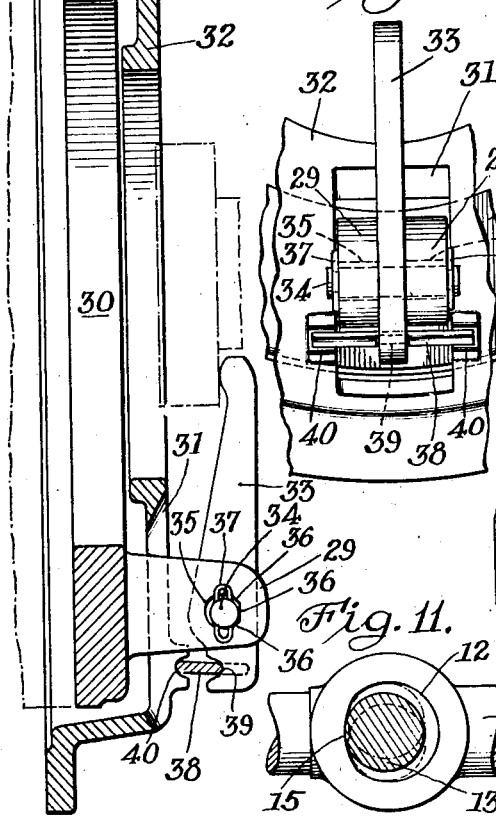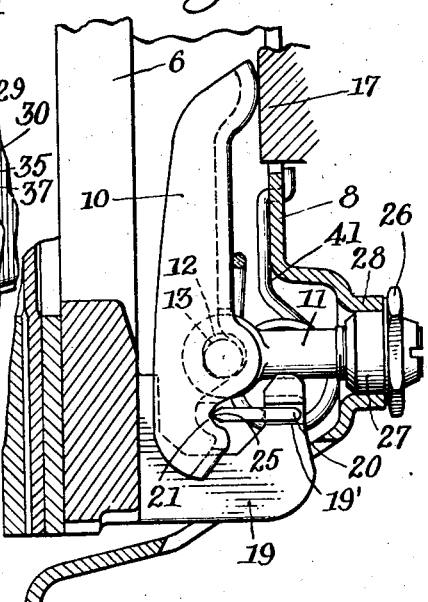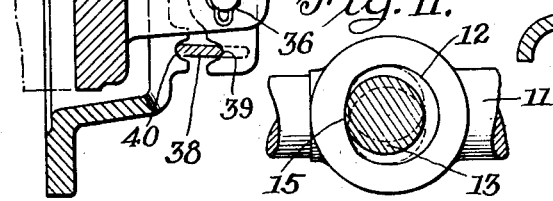

Patented Nov. 24, 1936

2,062,101

UNITED STATES PATENT OFFICE 2,062,101

FRICTION CLUTCH

Harold Nutt and Harold V. Reed, Chicago, Ill., assignors, by mesne assignments, to Borg-Warner Corporation, Chicago, Ill., a corporation of Illinois Application December 2, 1932, Serial No. 645,392

15 Claims. (Cl. 192—68)

This invention relates to friction clutches and is particularly useful in that type of clutch which is employed in connection with the power plant of an automotive vehicle.

Modern traffic and traveling conditions require that the clutch of an automotive vehicle should be operated more frequently than has been the practice in the past, and the frequency of operations has increased so markedly that automatic clutch releases are often provided. In a freewheeling unit with an automatic clutch release it is estimated that the clutch is engaged and disengaged at least twice as many times as with normal foot operation. This condition has naturally resulted in an increase of wear on the rubbing parts of the clutch and this increase in wear has resulted in an increase in friction between the rubbing parts to such an extent that the force required to release the clutch is appreciably greater than formerly. One type of automatic clutch release is operated by vacuum from the engine of the vehicle and under some conditions the power available for operating the vacuum diaphragm is barely sufficient to disengage the clutch when the clutch is new and when the wear of rubbing parts increases the friction the automatic release is sometimes rendered inoperative especially in high altitudes where the vacuum is greatly reduced.

The primary object of this invention is to improve the action and thereby increase the efficiency of a friction clutch by reducing the friction between its moving parts.

And a further object of the invention is to substitute a rolling contact for a rubbing contact between moving parts of a friction clutch and thereby reduce the friction between the parts and increase the mechanical efficiency of the clutch.

We have illustrated selected embodiments of the invention in the accompanying drawings and referring thereto Fig. 1 is a vertical sectional view of one type of clutch embodying the invention, the housing and some other parts being shown in broken lines.

Fig. 2 is an elevation of the clutch shown in Fig. 1, parts being broken away.

Fig. 3 is an enlarged detail sectional view showing one of the lever units of the clutch shown in Fig. 1.

Fig. 4 is a detail sectional view on the line 4—4 of Fig. 3.

Fig. 5 is a sectional view on the line 5—5 of Fig. 3.

Fig. 6 is a detail enlarged sectional view of the pivot pin bearing in the eye bolt.

Fig. 7 is a detail sectional view showing another form of the invention.

Fig. 8 is a detail sectional view showing the invention applied to a pull-type clutch.

Fig. 9 is a detail plan view of a lever unit of the pull-type clutch.

Fig. 10 is a detail sectional view showing another form of the invention, and

Fig. 11 is a view similar to Fig. 6 showing another form of the pivot bearing.

Referring to Figs. 1–6 of the drawings, 1 is a flywheel rigidly mounted on a driving shaft, 2 is a clutch release device operating on the sleeve 3, and 4 is a housing enclosing the clutch and its associated parts. A clutch plate 5 is rigidly mounted on the driven shaft and is clamped by a pressure plate or ring 6 and springs 7 against the flywheel 1 whereby to impart motion from the driving shaft and flywheel through the clutch plate to the driven shaft. The invention may be used with clutch plates of different kinds and therefore it will not be necessary to enter into a detail description thereof. A cover plate 8 is fastened to the flywheel by bolts 9 and clutch levers 10 are pivotally mounted on eye bolts 11 supported in the cover and are adapted to be operated by the clutch release 2 to retract the pressure plate against the tension of the springs 7 and release the clutch.

Each eye bolt 11 has an enlarged opening or eye 12 forming a bearing for a transverse floating pin 13, Figs. 4, 6, which forms a pivot pin for the lever and is retained in place in said opening by the flanges 10' on the lever. In order that the pivot pin 13 may be held with its axis against axial movement relative to the lever 10, a cylindrical walled depression 13ª may be formed transversely of the lever body within which the pin 13 is partially received, as best illustrated in Fig. 3. We prefer to employ a radius of curvature for the depression 13ª that is equal to the radius of curvature of the wall of the pin 13 so that the pin may be held by surface contact with the lever from turning about its axis relative to the lever during lever oscillation. The diameter of the opening 12 in the eye bolt is longer than the diameter of the pivot pin, Fig. 6, and this permits the pivot pin to roll in its bearing in the eye bolt instead of rubbing as it would if it fitted closely therein. If the pivot pin fits in the opening in the eye bolt to turn therein it will rub on the bearing formed by the wall of the opening but if the opening is larger than the pivot pin the pin will tend to roll instead of rub on the bearing and this rolling action is promoted by providing one or more flats 14 on that part of the wall of the enlarged opening in the eye bolt which forms the bearing for the pivot pin. The rolling action of the pivot pin on its bearing imparts a radial bodily movement to the lever limited by the pivot pin engaging a side wall of the opening in the eye bolt. This rolling action materially reduces and practically eliminates the wear between the pivot pin and the eye bolt and this results in a corresponding reduction in friction. The mounting of the pivot pin 13 within an opening, in the eyebolt 11, of larger diameter than the diameter of the pin, permitting the pin to roll upon the wall of the opening, provides, for the pin, the function of a floating pivot, in that it is free of confinement during normal oscillating movement of the lever with which it is associated, as distinguished from a fixed pivot of conventional form.

Instead of providing flats 14, as shown in Fig. 6, to form the bearing for the pivot pin in the eye bolt, we may form the bearing section 15 of the wall of the opening in the eye bolt in an arc of a longer radius than the radius of the remaining portion of the wall of the opening as shown in Fig. 11.

The inner end or tail 11' of the eye bolt engages an opening 16 in the pressure ring to maintain the eye bolt in proper position and prevent lateral movement of the clutch lever. The inner end of the clutch lever engages a bearing 17 of the clutch release device and the other end of the lever is recessed at 18 to receive a boss 19 on the pressure ring. This outer end of the clutch lever cooperates with the boss on the pressure ring to move the pressure ring against the tension of the springs 7 and release the clutch plate from clamping engagement between the pressure ring and the flywheel and, to avoid a rubbing action between the lever and the boss and reduce friction, we interpose a strut 20 between these parts, Figs. 3, 5. This strut is in the form of a comparatively thin plate which is rounded at one edge 20' to engage a curved socket 21 in the lever and is recessed at 22 to form guides 22' which engage grooves 19' in the boss. The edge 20" of the strut which engages the boss is rounded like the edge 20' which engages the lever. The curve of the socket 21 in the lever is on a longer radius than the curve of the rounded edge 20' of the strut, and the grooves 19' in the boss are wider than the thickness of the strut guides 22' so that the strut may have a free and uninterrupted oscillating movement under the action of the clutch lever. This construction produces an effective rolling action between one edge of the strut and the boss and the other edge of the strut acts against the lever with a combination rolling and sliding action which develops much less friction than if a sliding action alone occurred. Thus the friction is reduced and substantially eliminated.

The construction of Fig. 7 corresponds with that of Figs. 1–5 except that the lever is provided with a crown 23 and the strut has a flat edge 24 to engage therewith. This construction permits a somewhat freer rolling action of the lever on the strut than in the construction of Figs. 1–5.

Instead of rounding the inner edge of the strut, as shown in Figs. 1–5, we may provide it with a knife edge 25 to engage the socket 21, as shown in Fig. 10, and in this figure we have also shown that the tail 11' of the eye bolt and its opening 16 in the pressure ring may be omitted and the eye bolt secured in fixed position in the cover by providing the nut 26 with an extension 27 which fits snugly within a collar 28 on the cover. Springs 41 engage the cover plate and the clutch levers to prevent the levers from rattling or chattering and they also cooperate with the springs 7 to hold the clutch levers against the pivot pins and the pivot pins against their bearings in the eye bolts.

We have thus far described the invention as embodied in a push-type clutch but it may be embodied in a pull-type clutch as shown in Figs. 8–9 wherein lugs 29 on the pressure ring 30 extend through openings 31 in the cover 32 and take the place of the eye bolts previously described as supports for the clutch levers 33. A clutch lever is arranged between two lugs and a pivot pin 34 passes therethrough and projects laterally from the sides of the lever through enlarged openings 35 in the lugs and the walls of these openings are provided with flats 36, as in Fig. 6, to form bearings for the pin. The pin is held in place in the lugs and lever by keys 37 which engage the ends of the pin and the lugs. In this construction the levers are arranged outside of the cover and pull the pressure ring away from the clutch plate, instead of pushing it away as previously described. The strut 38 is arranged between the outer end of the clutch lever and the cover plate and has rounded edges with one edge engaging a socket 39 in the lever and the other edge engaging a socket 40 in the cover. The radial movement of the lever is slight and the strut is consequently rocked only a limited amount in the socket in the cover. The strut acts against this socket with a rolling action during the slight movement of the strut that is sufficient to release the clutch. The strut and the socket in the lever act with a combination rolling and sliding action.

The invention provides for a rolling contact for the moving parts of the clutch and thereby materially reduces friction and wear and prolongs the life of the clutch. The rolling bearing in the support reduces to a minimum friction between the clutch lever pivot and the support, and the movable strut interposed between the lever and the pressure ring reduces to a minimum friction between these parts. Furthermore, by providing these rolling contacts we avoid any material change in the lever ratio during its movement and thereby maintain the advantage of a fixed lever arm. A clutch embodying this invention may be lubricated when made as has been customary heretofore but it is not necessary that this should be done because the rolling contact will avoid the necessity for lubrication which has been required by rubbing contact heretofore.

We have shown and described the invention in several forms suitable for automobile clutches but we do not restrict the invention to these forms or to these clutches and we reserve the right to embody the invention in any other form and in any other clutches for which it is or may be adapted within the scope of the following claims.

We claim:

1. A friction clutch comprising a pressure ring, a pivot, a lever for operating said ring and carried by said pivot, and a movable strut interposed between said pressure ring and lever and having opposite edges engaged with said pressure ring and lever, the edge of the strut in engagement with the pressure ring being shaped to provide rolling action between said strut and pressure ring upon movement of said lever about said pivot.

2. A friction clutch comprising a pressure ring, a pivot, a lever for operating said ring and carried by said pivot, and a bearing having a flat providing a rolling action for said pivot.

3. A friction clutch comprising a pressure ring, a lever for operating said ring, a pivot for said lever, and a support having an enlarged opening to receive said pivot, a part of the wall of said opening being described on a radius longer than the radius of the other part of the wall of the opening to form a bearing for providing a rolling action for said pivot.

4. A friction clutch comprising a pressure ring, a floating pivot, a lever for operating said ring and carried by said floating pivot, and means providing a rolling action for said pivot.

5. A friction clutch comprising a pressure ring, a floating pivot, a lever for operating said ring and carried by said floating pivot and having flanges, said floating pivot being arranged between said flanges, and means providing a rolling action for said pivot.

6. A friction clutch comprising a pressure ring, a floating pivot, a lever for operating said ring and carried by said floating pivot, a support having a bearing to receive said pivot, retaining means for said pivot, and means on said bearing providing a rolling action for said pivot.

7. A friction clutch comprising a pressure ring, a lever for operating said ring, and a movable strut interposed between said pressure ring and lever and having opposite edges engaged with said pressure ring and lever, the contacting parts of said strut and lever being convex and concave, the convex part having a smaller radius than the concave part to provide for a combination of rolling and sliding action between said strut and lever.

8. A friction clutch comprising a pressure ring, a lever for operating said ring, and a movable strut interposed between said pressure ring and lever and having opposite edges engaged with said pressure ring and lever, said edges being rounded to provide for rolling action between said strut and the pressure ring and lever.

9. A friction clutch comprising a pressure ring having guide means, a lever for operating said ring, and a movable strut interposed between said pressure ring and lever and guided in said guide means on the pressure ring, said strut having rounded edges engaging the pressure ring and lever to provide for rolling contact between the strut and the pressure ring and lever.

10. A friction clutch comprising a pressure ring, a lever for operating said ring, said lever having a crown, and a movable strut engaged with said crown and with said pressure ring for imparting movement from the lever to the pressure ring, said strut being movable relative to the lever and ring and having rolling contact with said crown.

11. A friction clutch comprising a pressure ring, a cover having a socket, a lever for operating said ring and having a socket, and a movable strut having rounded surfaces engaging said sockets to provide for rolling contact between the strut and the cover and lever.

12. A friction clutch comprising a cover, a pressure ring, a support on the cover, a lever mounted on said support for operating said ring, and means on said support for imparting a longitudinal bodily movement to said lever with a rolling action when operating the ring.

13. A friction clutch comprising a cover, a pressure ring, a support on the cover having an eye therein, the wall of the eye having a flat, a pivot pin loosely arranged in said eye and having rolling contact with said flat, and a lever carried by said pin for operating the ring.

14. A friction clutch comprising a cover, a pressure ring, a support on the cover having an eye therein, a pivot pin loosely arranged in said eye, and a lever carried by said pin for operating the ring, said lever having depending flanges opposite the ends of said pin for retaining the pin in the eye.

15. In a friction clutch, a pressure ring, a simple lever for operating said ring, said lever having a depression formed therein, means providing a support, and a pivot for said lever comprising a pivot member disposed partially within said lever depression and presenting a convex surface engageable with said support whereby to provide a rolling action between said pivot and support.

HAROLD NUTT.
HAROLD V. REED.